(12) United States Patent
Gao

(10) Patent No.: US 12,373,194 B2
(45) Date of Patent: Jul. 29, 2025

(54) METHOD AND SYSTEM FOR REPAIRING DEVICE TREE, AND COMPUTER-READABLE STORAGE MEDIUM

(71) Applicant: Huawei Technologies Co., Ltd., Shenzhen (CN)

(72) Inventor: Ming Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 18/044,938

(22) PCT Filed: Aug. 13, 2021

(86) PCT No.: PCT/CN2021/112448
§ 371 (c)(1),
(2) Date: Mar. 10, 2023

(87) PCT Pub. No.: WO2022/052739
PCT Pub. Date: Mar. 17, 2022

(65) Prior Publication Data
US 2023/0385046 A1    Nov. 30, 2023

(30) Foreign Application Priority Data
Sep. 10, 2020   (CN) .......................... 202010949031.7

(51) Int. Cl.
*G06F 8/658*    (2018.01)
*G06F 8/65*     (2018.01)
*G06F 21/57*    (2013.01)

(52) U.S. Cl.
CPC ................ *G06F 8/658* (2018.02); *G06F 8/65* (2013.01); *G06F 21/572* (2013.01)

(58) Field of Classification Search
CPC .. G06F 8/60–66; G06F 21/572; G06F 21/575; H04L 41/08–0895
See application file for complete search history.

(56) References Cited

U.S. PATENT DOCUMENTS

| 8,495,420 B2* | 7/2013 | Gokhale | G06F 8/65 |
| | | | 714/15 |
| 11,593,085 B1* | 2/2023 | Khare | G06F 8/65 |
| 11,947,953 B2* | 4/2024 | Abe | G06F 3/0679 |
| 2003/0172260 A1* | 9/2003 | Huang | G06F 9/4406 |
| | | | 713/1 |
| 2021/0157573 A1* | 5/2021 | Abe | G06F 3/14 |

FOREIGN PATENT DOCUMENTS

| CN | 106406872 A | 2/2017 |
| CN | 107301070 A | 10/2017 |
| CN | 107632828 A | 1/2018 |

* cited by examiner

*Primary Examiner* — Todd Aguilera
(74) *Attorney, Agent, or Firm* — Conley Rose, P.C.

(57) ABSTRACT

A method for repairing a device tree includes: a development device performing differential processing on device tree source data and device tree target data to obtain patch data; the development device sending the patch data to user equipment; the user equipment patching an original device tree image file by using the patch data; and the user equipment repairing the original device tree image file to obtain an updated device tree image file.

20 Claims, 6 Drawing Sheets

| | Boot partition | | Device tree blob overlay partition | | System partition | Vendor partition | | |

METHOD AND SYSTEM FOR REPAIRING DEVICE TREE, AND COMPUTER-READABLE STORAGE MEDIUM

This is a National Stage of International Patent Application No. PCT/CN2021/112448 filed on Aug. 13, 2021, which claims priority to Chinese Patent Application No. 202010949031.7 filed on Sep. 10, 2020, both of which are hereby incorporated by reference in their entireties.

TECHNICAL FIELD

This application belongs to the field of terminal technologies, and in particular, to a method and system for repairing a device tree, and a computer-readable storage medium.

BACKGROUND

A device tree is a data structure that describes hardware resources. Currently, many electronic devices use the device tree to describe hardware resources, thereby reducing description code of hardware resources in kernel source code, so that the kernel source code is independent of description of hardware resources.

The device tree is usually stored in a storage area of an electronic device in a form of an image file. In addition to the device tree image file, the storage area of the electronic device further includes another type of image file.

Currently, if the device tree needs to be repaired, a developer can repair the device tree only by releasing a new version file. Each image file carries information such as a version number. Therefore, when the developer releases a new version file, each image file needs to be updated based on the version file. As a result, excessive content is to be updated.

In addition, the developer needs to perform steps such as compilation, basic function test, compatibility test suite (Compatibility Test Suite, CTS), and submission for test to release a new version file. The entire version release process is long and slow, and a large amount of manpower and time are consumed.

SUMMARY

Embodiments of this application provide a method for repairing a device tree, a development device, user equipment, a system, and a computer-readable storage medium, which can resolve problems of excessive to-be-updated content, and a long and slow release process, as well as a large amount of consumed manpower and time in the current solution for repairing a device tree.

According to a first aspect, embodiments of this application provide a method for repairing a device tree, applied to a development device, and including:
  obtaining device tree source data and device tree target data;
  performing differential processing on the device tree source data and the device tree target data to obtain patch data; and
  sending the patch data to user equipment, to indicate the user equipment to perform differential synthesis on the patch data and an original device tree image file in the user equipment, to obtain an updated device tree image file.

It should be noted that the device tree source data is device tree data existing before patch repair, and the device tree target data is device tree data obtained after patch repair. The device tree target data is obtained through compilation by a developer.

When repairing the device tree, the development device can first obtain the device tree source data and the device tree target data. Then, the development device performs differential processing on the device tree source data and the device tree target data to obtain the patch data.

After obtaining the patch data, the development device may send the patch data to the user equipment.

After obtaining the patch data, the user equipment performs differential synthesis on the patch data and the original device tree image file to obtain an updated device tree image file. The original device tree image file is a local device tree image file of the user equipment.

In the foregoing method for repairing a device tree, the development device repairs the device tree in a patch manner, and does not need to release a new version file, thereby reducing to-be-updated content. In addition, releasing patch data does not need to go through a complex version test and release process, so that the speed for repairing a device tree can be improved, and the manpower and time consumption can be reduced.

In a possible implementation of the first aspect, the obtaining device tree source data and device tree target data includes:
  obtaining a basic device tree image file and a target device tree image file;
  performing format parsing on the basic device tree image file to obtain device tree source data corresponding to each mainboard identifier; and
  performing format parsing on the target device tree image file to obtain device tree target data corresponding to each mainboard identifier.

Correspondingly, the performing differential processing on the device tree source data and the device tree target data to obtain patch data includes:
  separately performing differential processing on the device tree source data and the device tree target data that correspond to each mainboard identifier to obtain patch data corresponding to each mainboard identifier.

It should be noted that, when obtaining the device tree source data and the device tree target data, the development device may first obtain the basic device tree image file and the target device tree image file.

The basic device tree image file is a device tree image file existing before patch repair, and the target device tree image file is a device tree image file obtained after patch repair. The target device tree image file is compiled by the developer.

Then, the development device may perform format parsing on the basic device tree image file, to obtain the device tree source data corresponding to one or more mainboard identifiers. The development device may perform format parsing on the target device tree image file, to obtain the device tree target data corresponding to the one or more mainboard identifiers.

In this case, the development device may separately perform differential processing on the device tree source data and the device tree target data that correspond to each mainboard identifier, to obtain patch data corresponding to each mainboard identifier.

If device tree source data corresponding to a mainboard identifier does not need to be repaired, the device tree source data corresponding to the mainboard identifier is consistent with device tree target data corresponding to the mainboard identifier. After the development device performs differential processing on the device tree source data and the device tree target data that correspond to the mainboard identifier, obtained patch data is empty.

If device tree source data corresponding to a mainboard identifier needs to be repaired, the device tree source data corresponding to the mainboard identifier is inconsistent with device tree target data corresponding to the mainboard identifier. After the development device performs differential processing on the device tree source data and the device tree target data corresponding to the mainboard identifier, code changed by the developer, that is, patch data, may be obtained.

In a possible implementation of the first aspect, the sending the patch data to the user equipment includes:
  encapsulating the patch data into a patch file based on a preset data format; and
  sending the patch file to the user equipment.

It should be noted that, after obtaining the patch data, the development device may encapsulate the patch data based on the preset data format, to obtain the patch file. Then, the development device sends the patch file to the user equipment.

According to a second aspect, embodiments of this application provide a method for repairing a device tree, applied to user equipment, and including:
  obtaining patch data, where the patch data is data obtained by performing differential processing on device tree source data and device tree target data by a development device;
  obtaining an original device tree image file; and
  performing differential synthesis on the patch data and the original device tree image file to obtain an updated device tree image file.

It should be noted that, when performing the repairing of device tree, the user equipment may first obtain the patch data. The patch data is obtained by the development device by performing differential processing on the device tree source data and the device tree target data.

Then, the user equipment may obtain a local original device tree image file, and perform differential synthesis on the patch data and the original device tree image file, to obtain an updated device tree image file generated after patch repair.

In the foregoing method for repairing a device tree, the user equipment repairs the device tree in a patch manner, and does not need to release a new version file, thereby reducing to-be-updated content. In addition, repairing a device tree by using the patch data does not need to go through a complex version test and release process, thereby improving the speed for repairing device tree and reducing the manpower and time consumption.

In a possible implementation of the second aspect, the obtaining patch data includes:
  obtaining a patch file, where the patch file includes patch data corresponding to at least one mainboard identifier;
  obtaining a target mainboard identifier; and
  searching the patch file for target patch data corresponding to the target mainboard identifier.

Correspondingly, the performing differential synthesis on the patch data and the original device tree image file to obtain an updated device tree image file includes:
  if the target patch data corresponding to the target mainboard identifier exists in the patch file, performing differential synthesis on the target patch data and the original device tree image file to obtain the updated device tree image file.

It should be noted that, the development device may perform format parsing on the basic device tree image file to obtain the device tree source data corresponding to each mainboard identifier, and the development device may perform format parsing on the target device tree image file to obtain the device tree target data corresponding to each mainboard identifier.

Then, the development device may separately perform differential processing on the device tree source data and the device tree target data that correspond to each mainboard identifier, to obtain patch data corresponding to each mainboard identifier.

Then, the development device encapsulates the patch data corresponding to each mainboard identifier into a patch file, and sends the patch file to the user equipment.

When performing patch repair, the user equipment may obtain the patch file first. The patch file includes the patch data corresponding to one or more mainboard identifiers.

In this case, the user equipment may obtain the target mainboard identifier of the user equipment, and search the patch file for the target patch data corresponding to the target mainboard identifier.

If the target patch data corresponding to the target mainboard identifier is not found in the patch file, it indicates that the original device tree image file does not need to be patched, and the user equipment may continue to perform the startup step of starting the operating system based on the original device tree image file.

If the target patch data corresponding to the target mainboard identifier is found in the patch file, it indicates that the original device tree image file needs to be patched. In this case, the user equipment may perform differential synthesis on the target patch data and the original device tree image file, to obtain an updated device tree image file (that is, the device tree image file generated after patch repair).

The basic device tree image file may include device tree source data of one or more mainboard identifiers, and the original device tree image file may include only device tree source data of a part of mainboard identifiers in the one or more mainboard identifiers. Therefore, the original device tree image file and the basic device tree image file above may or may not be the same.

Similarly, the target device tree image file may include device tree target data of one or more mainboard identifiers, and the updated device tree image file may include only device tree target data of a part of mainboard identifiers in the one or more mainboard identifiers. Therefore, the target device tree image file and the updated device tree image file may or may not be the same.

In a possible implementation of the second aspect, the obtaining patch data includes:
  obtaining a digital signature of a patch partition, and performing security check on the patch partition based on the digital signature of the patch partition; and
  obtaining the patch data from the patch partition if the security check on the patch partition succeeds.

It should be noted that, when the user equipment obtains patch data from the patch partition, to prevent data in the patch partition from being tampered with, the user equipment may obtain a digital signature of the patch partition, and perform security check on the patch partition based on the digital signature of the patch partition.

If the security check on the patch partition succeeds, it indicates that the data in the patch partition is not tampered with, and the user equipment may obtain the patch data from the patch partition.

In a possible implementation of the second aspect, before the obtaining a digital signature of a patch partition, the method further includes:

receiving patch data sent by the development device, and storing the patch data in the patch partition.

It should be noted that, the memory of the user equipment may be divided into a plurality of partitions. For example, the read-only memory of the user equipment may be divided into partitions such as a boot (boot) partition, a device tree blob overlay (device tree blob overlay, Dtbo) partition, a system (system) partition, and a vendor (vendor) partition.

When the user equipment receives the patch data sent by the development device, the user equipment may store the patch data in a local patch partition.

In a possible implementation of the second aspect, the obtaining an original device tree image file includes:

obtaining a digital signature of a device tree partition, and performing security check on the device tree partition based on the digital signature of the device tree partition; and if the security check on the device tree partition succeeds, obtaining the original device tree image file from the device tree partition.

It should be noted that, when the user equipment obtains the original device tree image file from the device tree partition, to prevent data in the device tree partition from being tampered with, the user equipment may obtain a digital signature of the device tree partition, and perform security check on the device tree partition based on the digital signature of the device tree partition.

If the security check on the device tree partition succeeds, it indicates that the data in the device tree partition is not tampered with, and the user equipment may obtain the original device tree image file from the device tree partition.

According to a third aspect, embodiments of this application provide an electronic device, including:

a first data module, configured to obtain device tree source data and device tree target data;

a differential processing module, configured to perform differential processing on the device tree source data and the device tree target data to obtain patch data; and a data sending module, configured to send the patch data to user equipment, to indicate the user equipment to perform differential synthesis on the patch data and an original device tree image file in the user equipment to obtain an updated device tree image file.

In a possible implementation of the third aspect, the first data module includes:

a file obtaining submodule, configured to obtain a basic device tree image file and a target device tree image file;

a basic parsing submodule, configured to perform format parsing on the basic device tree image file to obtain device tree source data corresponding to each mainboard identifier; and a target parsing submodule, configured to perform format parsing on the target device tree image file to obtain device tree target data corresponding to each mainboard identifier.

Correspondingly, the differential processing module is specifically configured to perform differential processing on the device tree source data and the device tree target data that correspond to each mainboard identifier, to obtain patch data corresponding to each mainboard identifier.

In a possible implementation of the third aspect, the data sending module includes:

a format encapsulating submodule, configured to encapsulate the patch data into a patch file based on a preset data format; and a file sending submodule, configured to send the patch file to the user equipment.

According to a fourth aspect, embodiments of this application provide an electronic device, including:

a second data module, configured to obtain patch data, where the patch data is data obtained by performing differential processing on device tree source data and device tree target data by a development device;

an original file module, configured to obtain an original device tree image file, and a differential synthesis module, configured to perform differential synthesis on the patch data and the original device tree image file to obtain an updated device tree image file.

In a possible implementation of the fourth aspect, the second data module includes:

a patch file submodule, configured to obtain a patch file, where the patch file includes patch data corresponding to at least one mainboard identifier;

a target identifier submodule, configured to obtain a target mainboard identifier; and a patch searching submodule, configured to search the patch file for target patch data corresponding to the target mainboard identifier.

Correspondingly, the differential synthesis module is specifically configured to: if the target patch data corresponding to the target mainboard identifier exists in the patch file, perform differential synthesis on the target patch data and the original device tree image file to obtain the updated device tree image file.

In a possible implementation of the fourth aspect, the second data module includes:

a patch signing submodule, configured to obtain a digital signature of a patch partition, and perform security check on the patch partition based on the digital signature of the patch partition; and a patch check submodule, configured to: if the security check on the patch partition succeeds, obtain the patch data from the patch partition.

In a possible implementation of the fourth aspect, the second data module further includes:

a data receiving submodule, configured to receive patch data sent by the development device, and store the patch data in the patch partition.

In a possible implementation of the fourth aspect, the original file module includes:

a device signing submodule, configured to obtain a digital signature of a device tree partition, and perform security check on the device tree partition based on the digital signature of the device tree partition; and a device check submodule, configured to: if the security check on the device tree partition succeeds, obtain the original device tree image file from the device tree partition.

According to a fifth aspect, a development device is provided, including a memory, a processor, and a computer program that is stored in the memory and that can run on the processor. When the processor executes the computer program, an electronic device implements the method provided in the first aspect.

According to a sixth aspect, user equipment is provided, including a memory, a processor, and a computer program that is stored in the memory and that can run on the processor. When the processor executes the computer program, an electronic device implements the method provided in the second aspect.

According to a seventh aspect, a system for repairing a device tree is provided, including the development device provided in the fifth aspect and the user equipment provided in the sixth aspect.

According to an eighth aspect, a computer-readable storage medium is provided, where the computer-readable storage medium stores a computer program, and when the computer program is executed by a processor, an accessory device is enabled to implement the method provided in the first aspect, or implement the method provided in the second aspect.

According to a ninth aspect, a chip system is provided, where the chip system may be a single chip or a chip module including a plurality of chips, the chip system includes a memory and a processor, and the processor executes a computer program stored in the memory, to implement the method provided in the first aspect; or implement the method provided in the second aspect.

Compared with the conventional technology, embodiments of this application have the following beneficial effects.

In the method for repairing a device tree provided in this application, a development device performs differential processing on device tree source data and device tree target data to obtain patch data, and sends the patch data to user equipment. The user equipment patches an original device tree image file by using the patch data, and repairs the original device tree image file to obtain an updated device tree image file.

In the method for repairing a device tree provided in this application, the development device and the user equipment repair the device tree in a patch manner, and do not need to release a new version file, and a version number remains unchanged. Therefore, another image file in the version file does not need to be updated, thereby reducing to-be-updated content. In addition, when patch data is released, the patch data only needs to pass the single-point problem verification, and does not need to go through the complex version test and release process, thereby improving the speed of repairing device tree, and reducing the consumption of manpower and time, so that usability and practicability are high.

DESCRIPTION OF EMBODIMENTS

Figures 1, 2:
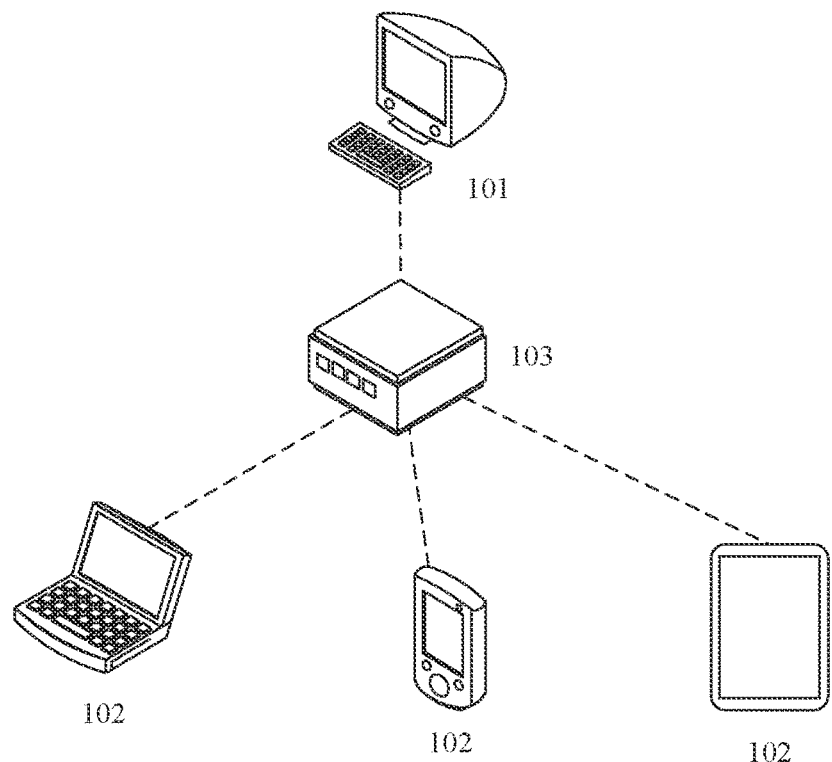
FIG. 1 is a schematic diagram of a structure of a system for repairing a device tree according to an embodiment of this application.
FIG. 2 is a schematic diagram of partitioning of a read-only memory according to an embodiment of this application.

In the following descriptions, for illustration instead of limitation, specific details such as a particular system structure and a technology are provided to make a thorough understanding of embodiments of this application. However, persons skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that when used in the specification of this application and the appended claims, the term "include" indicates the presence of the described features, wholes, steps, operations, elements and/or components, but does not preclude the presence or addition of one or more other features, wholes, steps, operations, elements, components, and/or collections thereof.

It should also be understood that the term "and/or" as used in the specification of this application and the appended claims refers to any combination of one or more of the associated items and all possible combinations, and includes such combinations.

As used in the specification of this application and in the appended claims, the term "if" may be interpreted as "when . . . " or "once" or "in response to determining" or "in response to detecting" depending on the context. Similarly, the phrase "if determining" or "if [described condition or event] is detected" may be interpreted, depending on the context, to mean "once determining" or "in response to determining" or "once [described condition or event] is detected" or "in response to detecting [described condition or event]".

In addition, in the description of the specification of this application and the appended claims, the terms "first", "second", "third", and the like are merely used for distinguishing descriptions, but cannot be understood as indicating or implying relative importance.

References to "one embodiment" or "some embodiments" described in the specification of this application mean that one or more embodiments of this application include a specific feature, structure, or characteristic described with reference to the embodiment. Therefore, statements "in one embodiment", "in some embodiments", "in some other embodiments". "in another embodiments" and the like that appear in different part of this specification do not necessarily refer to the same embodiment, but rather means "one or more but not all embodiments", unless otherwise specially emphasized. The terms "include", "contain", "have", and variations thereof all mean "including, but not limited to", unless otherwise specially emphasized.

A kernel is a core of an operating system. The kernel is first-layer software extension based on hardware resources, provides most basic functions of the operating system, and is a basis of the operating system. The kernel manages a process, a memory, a device driver, a file, and a network system of the operating system, and determines performance and stability of the system.

In kernel source code of the processor, there is a large amount of code that describes board-level details, for example, code that describes a platform (platform) device, a resource (resource), and platform data (platform_data) of various types of hardware. For the kernel, most of the code that describes board-level details is junk redundant code.

To reduce code that describes board-level details in the kernel source code, a device tree (Device Tree, dt) is introduced into kernels of some processors. For example, the device tree was introduced after ARM kernel version 3.x.

The device tree is a data structure that describes hardware resources. The device tree may transfer hardware resources to the kernel by using a bootloader (bootloader), so that the description of kernel source code and hardware resources is independent. In other words, the file in the dtb format (that is, the device tree file) may be read into the memory by the bootloader, and the processor kernel parses the file in the dtb format. In this case, for the kernel of the same type of the processor, only the device tree file needs to be changed so that the kernel of this type can adapt to different mainboards, and the kernel file of the kernel does not need to be changed.

The device tree is usually stored in a storage area of an electronic device in a form of an image file. In addition to the device tree image file, the storage area of the electronic device may further include another type of image file.

For example, a read only memory (Read only memory, ROM) of an electronic device may be divided into a plurality of partitions, and each partition stores image files such as a boot (boot) image file and a device tree blob overlay (device tree blob overlay, Dtbo) image file, a system (system) image file, and a vendor (vendor) image file.

Currently, the device tree can only be repaired by releasing a new version. However, the preceding image files include version numbers, and some image files even have timestamps. Therefore, in a process of compiling a new version file, all the foregoing image files change, and the entire version needs to be recompiled. As a result, excessive content is updated.

In addition, the release of the new version file requires steps such as compilation, basic function test, compatibility test suite, and submission for test. The entire version release process is long, slow, and labor-intensive.

In view of this, embodiments of this application provide a method for repairing a device tree, an electronic device, and a computer-readable storage medium, so that a device tree can be repaired in a patch repair manner, to resolve problems of excessively to-be-updated content, and a long and slow process of the current method for repairing a device tree. Usability and practicability are high.

First, the system for repairing a device tree shown in FIG. 1 is used as an example to describe electronic devices that are to be involved in embodiments of this application.

As shown in FIG. 1, the system for repairing a device tree includes one or more development devices 101 (only one is shown in FIG. 1), one or a plurality of user equipments 102 (three are shown in FIG. 1), and a transit device 103.

The development device 101 is an electronic device that generates a patch file, and the user equipment 102 is an electronic device that uses the patch file to repair the device tree.

A direct communication connection may be established between the development device 101 and the user equipment 102, that is, a direct communication connection is established between the development device 101 and the user equipment 102. Alternatively, an indirect communication connection may be established between the development device 101 and the user equipment 102. In other words, a transit device 103 responsible for transiting data is disposed between the development device 101 and the user equipment 102.

For example, after generating the patch file, the development device 101 may send the patch file to the user equipment 102 by using a communication connection directly connected to the user equipment 102. Alternatively, after generating the patch file, the development device 101 may send the patch file to the transit device 103, and the transit device 103 forwards the patch file to the user equipment 102.

The type of the foregoing communication connection may be set based on an actual situation. For example, the foregoing communication connection may include any one or more of wireless communication solutions such as wireless local area networks (wireless local area networks. WLAN) (for example, a wireless fidelity (wireless fidelity, Wi-Fi) network), Bluetooth (bluetooth. BT), RFID or ZigBee, and/or the foregoing communication connection may also include any one or more of wired communication solutions such as a Registered Jack 45 (Registered Jack 45, RJ45) connection.

The type of the electronic device of the foregoing development device 101, the user equipment 102, and the transit device 103 may be determined based on an actual situation. For example, the foregoing development device 101, the user equipment 102, and the transit device 103 may be a mobile phone, a tablet computer, a wearable device, an in-vehicle device, or an augmented reality (augmented reality, AR)/virtual reality (virtual reality. VR) device, a laptop, an ultra-mobile personal computer (ultra-mobile personal computer, UMPC), a netbook, a personal digital assistant (personal digital assistant, PDA), and another electronic device. A specific type of the foregoing development device 101, the user equipment 102, and the transit device 103 is not limited in embodiments of this application.

In addition, the foregoing development device 101, the user equipment 102, and the transit device 103 may be electronic devices of a same type. Alternatively, the foregoing development device 101, the user equipment 102, and the transit device 103 may be electronic devices of different types.

When there are a plurality of development devices 101, the plurality of development devices 101 may be electronic devices of a same type, or may be electronic devices of different types.

When there are a plurality of user equipments 102, the plurality of user equipments 102 may be electronic devices of a same type, or may be electronic devices of different types.

When there are a plurality of transit devices 103, the plurality of transit devices 103 may be electronic devices of a same type, or may be electronic devices of different types.

In addition, the system for repairing a device tree shown in FIG. 1 is merely an example of embodiments of this application, and should not be understood as a specific limitation on the system for repairing a device tree. In an actual application process, the system for repairing a device tree may have more or fewer electronic devices than the system for repairing a device tree shown in FIG. 1. For example, in some application scenarios, the system for repairing a device tree may not include the transit device 103, and a direct communication connection is established between the development device 101 and the user equipment 102. Therefore, the system for repairing a device tree is not limited in embodiments of this application.

The following describes in detail the method for repairing a device tree in embodiments of this application with reference to the system for repairing a device tree shown in FIG. 1 and a specific application scenario.

1. Generate a Patch File.

When generating the patch file, the development device may first obtain a basic device tree image file and a target device tree image file.

The basic device tree image file is a device tree image file existing before patch repair, and the target device tree image file is a device tree image file obtained after patch repair. The target device tree image file is compiled by the developer.

If the basic device tree image file and the target device tree image file are in a compressed format, the development device may decompress the basic device tree image file and the target device tree image file, and then perform format parsing on the decompressed basic device tree image file and target device tree image file.

If the basic device tree image file and the target device tree image file are not in a compressed format, the development device may directly perform format parsing on the basic device tree image file and the target device tree image file.

The development device performs format parsing on the basic device tree image file, and may obtain device tree source data (dtb.src) corresponding to each mainboard identifier (board id). The development device performs format parsing on the target device tree image file, and may obtain device tree target data (dtb.tgt) corresponding to each mainboard identifier.

Then, the development device may separately perform differential processing on the device tree source data and the device tree target data that correspond to each mainboard identifier by using a differential tool, to obtain patch data (dtb.patch) corresponding to each mainboard identifier.

Different mainboard identifiers are used to indicate different mainboards, or may be understood as indicating hardware resources of different products.

Because repairing a device tree may be targeted to fix vulnerabilities in some types of products, the developer may change device tree source data corresponding to only some mainboard identifiers.

In this case, if device tree source data corresponding to a mainboard identifier does not need to be repaired, the device tree source data corresponding to the mainboard identifier is consistent with device tree target data corresponding to the mainboard identifier. After the development device performs differential processing on the device tree source data and the device tree target data that correspond to the mainboard identifier, obtained patch data is empty.

If device tree source data corresponding to a mainboard identifier needs to be repaired, the device tree source data corresponding to the mainboard identifier is inconsistent with device tree target data corresponding to the mainboard identifier. After the development device performs differential processing on the device tree source data and the device tree target data corresponding to the mainboard identifier, code changed by the developer, that is, patch data, may be obtained.

For example, it is assumed that the basic device tree image file includes device tree source data corresponding to the mainboard identifier 0x1000b0x7 and device tree source data corresponding to the mainboard identifier 0x1000b0x9. If current repairing of the device tree is used to fix a vulnerability in the device tree source data corresponding to 0x1000b0x9, the developer may update the device tree source data corresponding to only 0x1000b0x9. In this case, the device tree source data and device tree target data corresponding to 0x000b0x9 are inconsistent, and patch data obtained after differential processing is not empty. However, the device tree source data corresponding to 0x1000b0x7 is not changed. Therefore, the device tree source data and device tree target data corresponding to 0x1000b0x7 are consistent, and patch data obtained after differential processing is empty.

After obtaining the patch data, the development device may generate the patch file based on the patch data corresponding to each mainboard identifier and a preset data format. In addition, the development device may further calculate a hash value of the device tree source data, a hash value of the device tree target data, and a hash value of the patch data that correspond to each mainboard identifier, and store the hash values in the patch file, so that the user equipment can check correctness of the patch data based on the hash values.

A hash algorithm used by the development device to calculate the hash values can be selected based on actual requirements. For example, in some embodiments, the development device may use the secure hash algorithm 256 (Secure Hash Algorithm 256, SHA-256) to calculate the hash values. In some other embodiment so the development device may alternatively use the hash algorithm such as SHA-224, SHA-384, or SHA-512 to calculate the hash values.

In addition, the preset data format may be set based on actual requirements. For example, in some embodiments, the preset data format may be shown in Table 1.

TABLE 1

| patch-dtbo.img (name of the patch file) | |
|---|---|
| dt_table_header (table header of the patch file) | magic (magic number) |
| | total_size (size of the target device tree image file) |
| | header_size (size of the table header) |
| | dt_entry_size (size of a device tree entry) |
| | dt_entry_count (quantity of device tree entries) |
| | dt_entries_offset (location of the device tree entry) |
| | page_size (page size) |
| | version (version number) |
| dt_table_entry_v1 (data substructure corresponding to a given type of mainboard) | dt_size (size of the patch data of a given type of mainboard) |
| | dt_offset (location of the patch data of a given type of mainboard) |
| | id (board id) (mainboard identifier of a given type of mainboard) |
| | patch Sha256[32] (hash value of the patch data) |
| | dst Size (size of the device tree target data) |
| | dst Sha256[32] (hash value of the device tree target data) |
| | src Size (size of the device tree source data) |
| | src Sha256[32] (hash value of the device tree source data) |
| | dtb (patch data) |

TABLE 1-continued

| patch-dtbo.img (name of the patch file) |
| --- |
| dt_table_entry_v2 (data substructure corresponding to another mainboard) |
| ... ... |
| dt_table_entry_v3 (data substructure corresponding to another mainboard) |

As shown in Table 1, the name of the patch file may be patch-dtbo.img, where img is an extension of the image file. The data structure of the patch file may include a table header and a data substructure corresponding to one or more mainboard identifiers (for example, a data substructure corresponding to one or more types of mainboards).

For example, the table header of the patch file may be dt_table_header in Table 1. The data substructure corresponding to each mainboard identifier in the patch file may be dt_table_entry_v1, dt_table_entry_v2, and dt_table_entry_v3 in Table 1.

The table header of the patch file may include parameters such as the magic number (magic), the size of the target device tree image file (total_size), the size of the table header (header_size), the size of the device tree entry (dt_entry_size), the quantity of the device tree entries (dt_entry_count), the location of the device tree entry (dt_entries_offset), the page size (page_size), and the version number (version). Content of each parameter in the table header is consistent with that in the table header of the target device tree image file. The development device may directly copy the content of each parameter in the table header of the target device tree image file as the table header of the patch file.

The data substructure corresponding to each mainboard identifier in the patch file may include parameters such as the size of the patch data of the given type of mainboard (dt_size), the location of the patch data of the given type of mainboard (dt_offset), and the location of the patch data of the given type of mainboard (dt_offset), the mainboard identifier of the given type of mainboard (id (board id)), the hash value of the patch data (patch Sha256[32]), the size of the device tree target data (dst Size), the hash value of the device tree target data (dst Sha256[32]), the size of the device tree source data (src Size), the hash value of the device tree source data (src Sha256[32]), and the patch data (dtb).

The development device may determine and fill content of each parameter in the data substructure corresponding to each mainboard identifier based on the device tree source data, the device tree target data, and the patch data that correspond to each mainboard identifier, to obtain the patch file.

It should be noted that the foregoing data structure is merely an example of embodiments of this application, and should not be understood as a limitation on the data structure of the foregoing patch file. In some other embodiments of this application, the data structure of the patch file may have more or fewer substructures and parameters than those shown in Table 1. The data structure of the patch file is not limited in embodiments of this application.

After generating the patch file, the development device may directly send the patch file to the user equipment, or the development device may upload the patch file to the transit device.

When the development device establishes a direct communication connection with the user equipment, the development device may directly push the generated patch file to the user equipment, or the user equipment may actively request the development device to deliver the patch file.

When the development device establishes an indirect communication connection with the user equipment, the development device may upload the patch file to a transit device (for example, a server), and the transit device pushes the patch file to the user equipment, or the user equipment may access the transit device to download the patch file.

2. Repair the Device Tree Image File.

After obtaining the patch file, the user equipment may store the patch file in a patch (Kpatch) partition of the storage space of the user equipment.

For example, as shown in FIG. 2, the ROM of the user equipment may be divided into partitions such as a boot (boot) partition, a device tree blob overlay (device tree blob overlay, Dtbo) partition, a system (system) partition, and a vendor (vendor) partition. After obtaining the patch file, the user equipment may store the patch file in the Kpatch partition of the ROM.

Then, when the operating system of the user equipment is started, the user equipment may obtain the original device tree image file from the device tree partition. When obtaining the original device tree image file, to prevent data in the device tree partition from being tampered with, the user equipment may obtain a digital signature of the device tree partition, and perform security check on the device tree partition based on the digital signature of the device tree partition. After the security check succeeds, the user equipment obtains the original device tree image file from the device tree partition.

Then, the user equipment can query and obtain the patch file in the patch partition. When obtaining the patch file, to prevent data in the patch partition from being tampered with, the user equipment may obtain a digital signature of the patch partition, and perform security check on the patch partition based on the digital signature of the patch partition.

After the security check succeeds, the user equipment may query whether an unapplied patch file exists in the patch partition.

If no unapplied patch file exists in the patch partition, the user equipment starts the operating system based on a normal startup process and based on the original device tree image file.

If the unapplied patch file exists in the patch partition, the user equipment may perform format parsing on the patch file to obtain corresponding target patch data.

The patch file includes patch data corresponding to one or more mainboard identifiers. Therefore, the user equipment may obtain corresponding target patch data from the patch file based on the target mainboard identifier.

The target mainboard identifier is an identifier of a mainboard of the user equipment. The user equipment may query, based on the target mainboard identifier, whether patch data corresponding to the target mainboard identifier exists in the patch file.

If the patch data corresponding to the target mainboard identifier exists in the patch file, the user equipment uses the patch data as the target patch data.

Then, the user equipment performs differential synthesis on the local original device tree image file and the target patch data by using a differential tool, to obtain an updated device tree image file.

After obtaining the updated device tree image file, the user equipment may check the updated device tree image file by using the foregoing hash values.

For example, the user equipment may perform format parsing on the updated device tree image file, to obtain device tree target data corresponding to the target mainboard identifier. Then, the user equipment may calculate the hash value of the device tree target data corresponding to the target mainboard identifier. If the hash value obtained through calculation is consistent with the hash value of the device tree target data corresponding to the target mainboard identifier in the patch file, the check of the updated device tree image file succeeds. If the hash value obtained through calculation is inconsistent with the hash value of the device tree target data corresponding to the target mainboard identifier in the patch file, the check of the updated device tree image file fails.

If the check succeeds, it indicates that patching succeeds. The user equipment can replace and overwrite the original device tree image file with the updated device tree image file to complete the device tree patch operation.

If the check fails, it indicates that patching fails. The user equipment may give up the device tree patch operation, or the user equipment may re-perform the device tree patch operation.

In addition, if the patch data corresponding to the target mainboard identifier does not exist in the patch file, it indicates that the original device tree image file on the user equipment does not need to be updated, and the user equipment may directly complete the device tree patch operation.

It should be noted that the basic device tree image file may include device tree source data of one or more mainboard identifiers, and the original device tree image file may include device tree source data of only a part of mainboard identifiers in the one or more mainboard identifiers. Therefore, the original device tree image file and the basic device tree image file may or may not be the same.

Similarly, the target device tree image file may include device tree target data of one or more mainboard identifiers, and the updated device tree image file may include device tree target data of only a part of mainboard identifiers in the one or more mainboard identifiers. Therefore, the target device tree image file and the updated device tree image file may or may not be the same.

After the patch operation is completed, the user equipment may continue to start the operating system based on a normal startup process and based on the device tree image file obtained after the patch operation, that is, the original device tree image file or the updated device tree image file.

The following describes in detail the foregoing method for repairing a device tree patch with reference to a specific application scenario.

Figure 3:
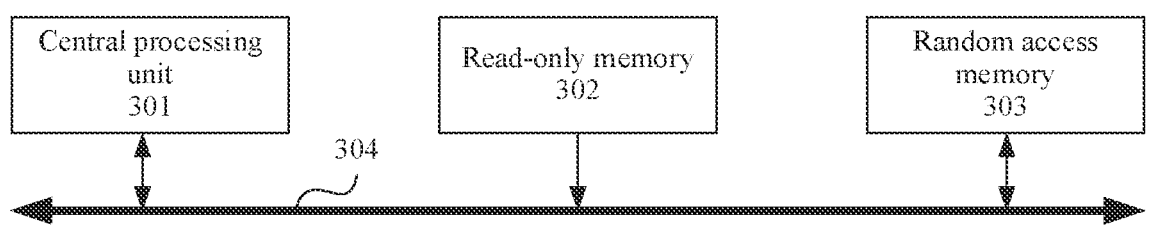
FIG. 3 is a schematic diagram of an electronic device according to an embodiment of this application.

Refer to FIG. 3 to FIG. 6. FIG. 3 is a schematic diagram of a structure of user equipment according to an embodiment of this application. As shown in FIG. 3, the user equipment may include a central processing unit (central processing unit, CPU) 301, a read-only memory (Read-Only Memory, ROM) 302, a random access memory (Random Access Memory, RAM) 303, and a bus 304.

The CPU 301, the ROM 302, and the RAM 303 exchange data via the bus 304.

Figure 4:
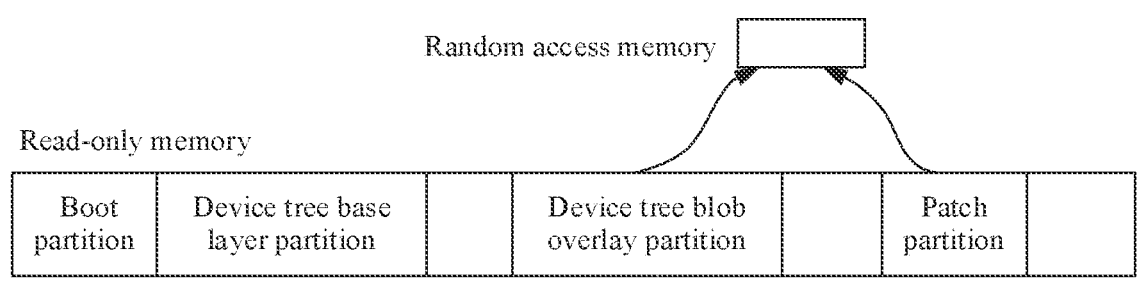
FIG. 4 is a schematic diagram of an application scenario according to an embodiment of this application.

As shown in FIG. 4, the ROM 302 may include partitions such as a boot (Boot) partition, a device tree (Device Tree, Dt) base layer partition, a device tree blob overlay (Dtbo) partition, and a patch (Kpatch) partition.

The Boot partition may include files such as a kernel (kernel) file and a random access memory disk (Random Access Memory disk, ram disk).

The Dtbo partition may include a device tree blob overlay image file (device tree blob overlay.img, Dtbo.img).

The Kpatch partition may include a patch file (patch-dtbo.img) of the device tree, or may further include patch packages such as a kernel patch file (kernel.patch).

The Dt base layer partition may include a device tree image file (Dt.img).

When the operating system is started, the CPU 301 may read data from partitions such as the Dtbo partition and the Kpatch partition of the ROM 302 to the RAM 303 to perform the foregoing method for repairing a device tree.

Figure 5:
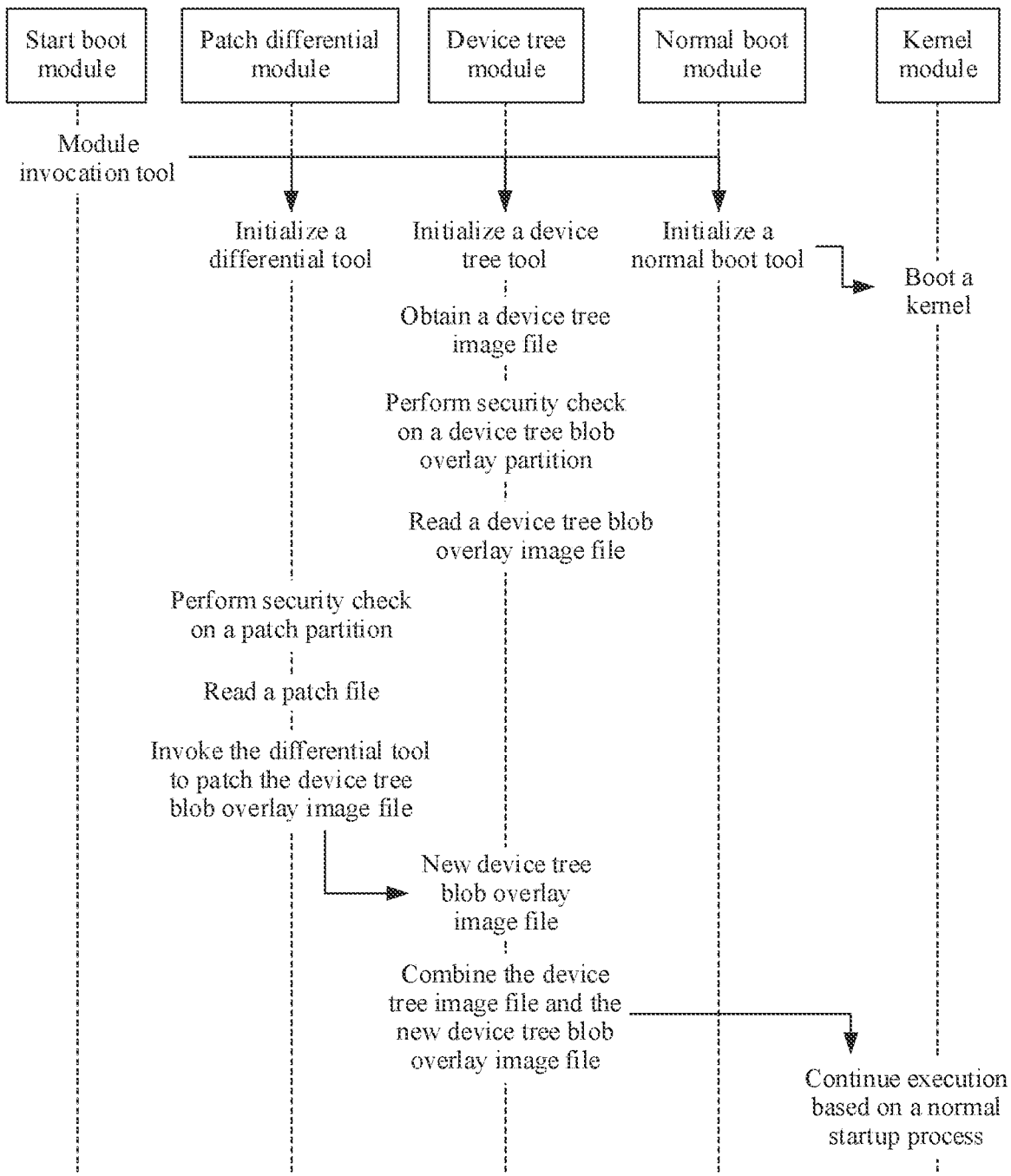
FIG. 5 is a signaling diagram of a method for repairing a device tree according to an embodiment of this application.

As shown in FIG. 5, it is assumed that the CPU 301 includes the following functional modules: a start boot (start_boot) module, a patch differential (diff patch_pre) module, a device tree (dobt) module, a normal boot (normal boot) module, and a kernel (kernel) module.

When the operating system is started, the start boot module may trigger initialization of a differential tool, initialization of a device tree tool, and initialization of a normal boot tool through a module invocation tool.

When the differential tool is initialized, the memory of the differential tool is initialized. After the normal boot tool is initialized, the kernel is booted.

The device tree partition may be understood as a Dt basic layer partition and a Dtbo partition. The original device tree image file may include Dt.img and Dtbo.img, where the Dt.img represents an image file of a basic layer of the device tree, and Dtbo.img indicates an image file of an overlay layer of the device tree.

Generally, the device trees corresponding to the mainboard identifiers of different models have the same basic layer of the device tree, but the overlay layers of the device tree are different. In addition, the device tree is usually repaired at the overlay layer of the device tree.

Therefore, the device tree module can obtain the Dt.img from the Dt basic layer partition through the device tree tool and start the Dt.img without any intervention.

However, when starting Dtbo.img, the device tree module may first obtain a digital signature of the Dtbo partition and data of the Dtbo partition, and perform security check on the data of the Dtbo partition based on the digital signature of the Dtbo partition to prevent the data of the Dtbo partition from being tampered with.

After the security check on the Dtbo partition succeeds, the device tree module can read and decompress Dtbo.img.

Then, the patch differential module may obtain a digital signature of the Kpatch partition and data of the Kpatch partition, and perform security check on the data of the Kpatch partition based on the digital signature of the Kpatch partition to prevent the data of the Kpatch partition from being tampered with.

After the security check on the Kpatch partition succeeds, the patch differential module can read the patch file in the Kpatch partition.

Because the patch file includes patch data corresponding to a plurality of mainboard identifiers, the patch differential module may obtain the target mainboard identifier of the equipment, and query whether the patch file includes target patch data corresponding to the target mainboard identifier.

If the patch file includes the target patch data corresponding to the target mainboard identifier, it indicates that Dtbo.img needs to be patched. If the patch file does not include the target patch data corresponding to the target mainboard identifier, it indicates that Dtbo.img does not need to be patched.

It is assumed that the patch file includes the target patch data corresponding to the target mainboard identifier. In this case, the patch differential module may invoke a differential tool to patch Dtbo.img, and perform differential synthesis on Dtbo.img and the target patch data corresponding to the target mainboard identifier to obtain new Dtbo.img (that is, a new device tree blob overlay image file).

Then, the patch differential module may obtain a hash value in the patch file, and check the new Dtbo.img based on the hash value in the patch file. If the check of the new Dtbo.img succeeds, the new Dtbo.img is copied to an original address of Dtbo.img to replace the original Dtbo.img.

After that, the device tree module may combine the Dt.img and the new Dtbo.img to obtain a complete device tree, and continue to perform subsequent steps based on a normal startup process of the operating system.

In the method for repairing a device tree in embodiments of this application, the development device performs differential processing on the device tree source data and the device tree target data that correspond to each mainboard identifier, to obtain patch data corresponding to each mainboard identifier. The user equipment patches the original device tree image file by using the patch data, and repairs the original device tree image file to obtain an updated device tree image file.

In the foregoing method for repairing a device tree, the development device and the user equipment repair the device tree in a patch manner, without compiling a complete version file, changing a version number, or updating another image file other than the device tree image file, which can greatly reduce to-be-updated content. For example, a data size of a previous version file is about 4 MB, and a data size of a current patch file is about 10 KB.

In addition, because the foregoing method for repairing a device tree fixes a vulnerability of the device tree in a patch manner, for single-point problems such as component replacement, power parameter restoration, and component bug (bug) fix, the patch file only needs to pass the verification on the single-point problems, and the original version file does not need to be changed. Therefore, the patch release does not require compilation, basic function test, compatibility test suite, and submission for test, which greatly shortens the time for repairing a device tree, improves the repair speed, and reduces the manpower and time consumption.

In addition, because the patch file may include patch data corresponding to a plurality of mainboard identifiers, a same patch package may adapt to a plurality of models and different mainboards, so that one patch package can fix vulnerabilities of device trees of a plurality of models. In addition, because a plurality of pieces of patch data are shared in the same patch file, when the user equipment checks the patch file, the patch file needs to be checked only once, and each piece of patch data does not need to be checked separately, thereby reducing the quantity of check times and improving patch efficiency.

If other patch packages exist in the patch partition besides the patch files in the device tree, the user equipment can control the loading sequence of the patch packages and load the patch packages based on the loading sequence to meet the repairing needs of the user equipment.

When the patch file adopts the data structure shown in Table 1, one patch file may be supported to adapt to a plurality of models. In addition, the hash value in the patch file may further check the updated device tree file, to ensure that data is not tampered with.

The foregoing method for repairing a device tree may perform patch repair on the device tree in various modes, and the foregoing modes may include modes such as a normal (normal) mode, a recovery (recovery) mode, an extra recovery (erecovery) mode, a fast booted (fast booted) mode.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 6:
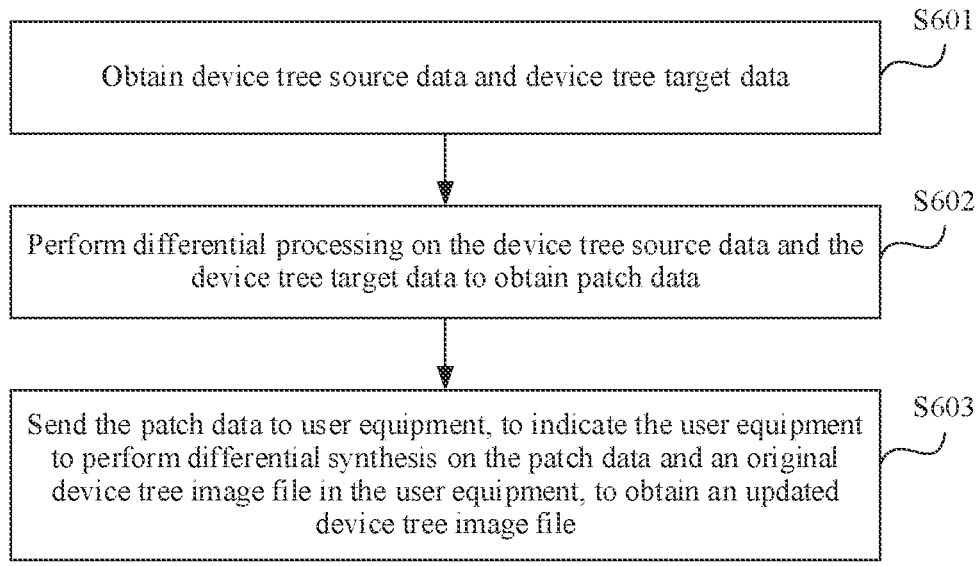
FIG. 6 is a schematic flowchart of a method for repairing a device tree according to an embodiment of this application.

The following describes in detail another method for repairing a device tree provided in embodiments of this application from a perspective of a development device. Refer to FIG. 6. The method for repairing a device tree provided in this embodiment includes the following steps.

S601: Obtain device tree source data and device tree target data.

S602: Perform differential processing on the device tree source data and the device tree target data to obtain patch data.

S603: Send the patch data to user equipment, to indicate the user equipment to perform differential synthesis on the patch data and an original device tree image file in the user equipment, to obtain an updated device tree image file.

Optionally, the obtaining device tree source data and device tree target data includes:
   obtaining a basic device tree image file and a target device tree image file;
   performing format parsing on the basic device tree image file to obtain device tree source data corresponding to each mainboard identifier; and
   performing format parsing on the target device tree image file to obtain device tree target data corresponding to each mainboard identifier.

Correspondingly, the performing differential processing on the device tree source data and the device tree target data to obtain patch data includes:
   performing differential processing on device tree source data and device tree target data corresponding to each mainboard identifier separately to obtain patch data corresponding to each mainboard identifier.

Optionally, the sending the patch data to user equipment includes:
   encapsulating the patch data into a patch file based on a preset data format; and
   sending the patch file to the user equipment.

In the method for repairing a patch in embodiments of this application, the development device repairs the device tree in a patch manner, and does not need to release a new version file, thereby reducing to-be-updated content. In addition, releasing patch data does not need to go through a complex version test and release process, thereby improving the speed for repairing a device tree and reducing the manpower and time consumption.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 7:
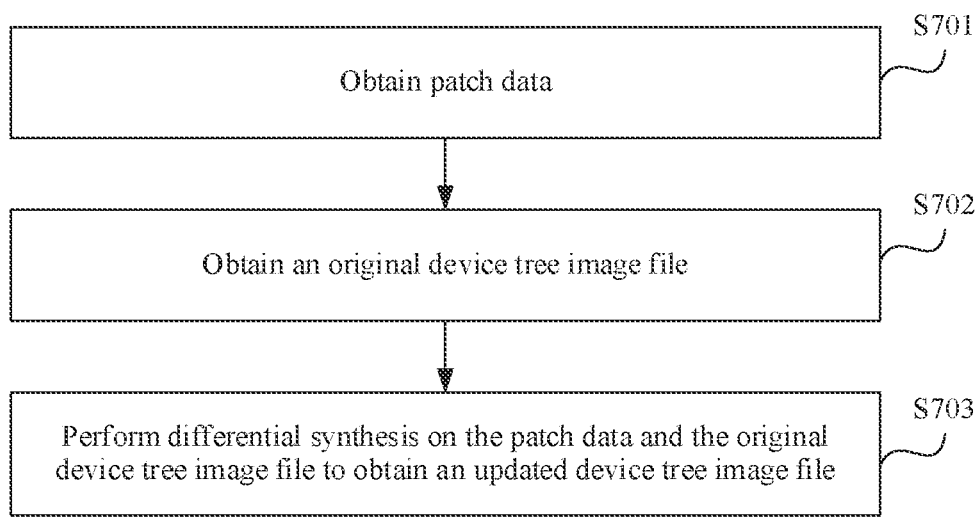
FIG. 7 is a schematic flowchart of another method for repairing a device tree according to an embodiment of this application.

The following describes in detail another method for repairing a device tree provided in embodiments of this application from a perspective of user equipment. Refer to FIG. 7. The method for repairing a device tree provided in this embodiment includes the following steps.

S701: Obtain patch data, where the patch data is data obtained by performing differential processing on device tree source data and device tree target data by a development device.

S702: Obtain an original device tree image file.

S703: Perform differential synthesis on the patch data and the original device tree image file to obtain an updated device tree image file.

Optionally, the obtaining patch data includes:
obtaining a patch file, where the patch file includes patch data corresponding to at least one mainboard identifier;
obtaining a target mainboard identifier; and
searching the patch file for target patch data corresponding to the target mainboard identifier.

Correspondingly, the performing differential synthesis on the patch data and the original device tree image file to obtain an updated device tree image file includes:
if the target patch data corresponding to the target mainboard identifier exists in the patch file, performing differential synthesis on the target patch data and the original device tree image file to obtain the updated device tree image file.

Optionally, the obtaining patch data includes:
obtaining a digital signature of a patch partition, and performing security check on the patch partition based on the digital signature of the patch partition; and
obtaining the patch data from the patch partition if the security check on the patch partition succeeds.

Optionally, before the obtaining a digital signature of a patch partition, the method further includes:
receiving patch data sent by the development device, and storing the patch data in the patch partition.

Optionally, the obtaining an original device tree image file includes:
obtaining a digital signature of a device tree partition, and performing security check on the device tree partition based on the digital signature of the device tree partition; and
if the security check on the device tree partition succeeds, obtaining the original device tree image file from the device tree partition.

In the method for repairing a device tree in embodiments of this application, the user equipment repairs the device tree in a patch manner, and does not need to release a new version file, thereby reducing to-be-updated content. In addition, repairing a device tree by using the patch data does not need to go through a complex version test and release process, thereby improving the speed for repairing device tree and reducing the manpower and time consumption.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 8:
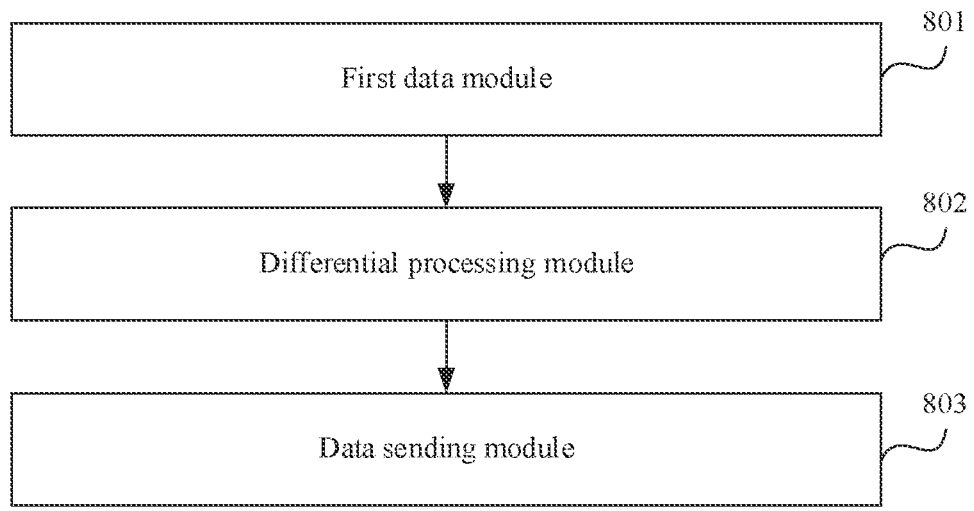
FIG. 8 is a schematic diagram of a development device according to an embodiment of this application.

The following describes in detail a development device provided in embodiments of this application. Refer to FIG. 8. The development device provided in this embodiment includes:
a first data module 801, configured to obtain device tree source data and device tree target data;
a differential processing module 802, configured to perform differential processing on the device tree source data and the device tree target data to obtain patch data; and
a data sending module 803, configured to send the patch data to user equipment, to indicate the user equipment to perform differential synthesis on the patch data and an original device tree image file in the user equipment to obtain an updated device tree image file.

Optionally, the first data module 801 includes:
a file obtaining submodule, configured to obtain a basic device tree image file and a target device tree image file;
a basic parsing submodule, configured to perform format parsing on the basic device tree image file to obtain device tree source data corresponding to each mainboard identifier; and
a target parsing submodule, configured to perform format parsing on the target device tree image file to obtain device tree target data corresponding to each mainboard identifier.

Correspondingly, the differential processing module 802 is specifically configured to separately perform differential processing on the device tree source data and the device tree target data that correspond to each mainboard identifier, to obtain patch data corresponding to each mainboard identifier.

Optionally, the data sending module 803 includes:
a format encapsulating submodule, configured to encapsulate the patch data into a patch file based on a preset data format; and
a file sending submodule, configured to send the patch file to user equipment.

It should be noted that content such as information exchange between the foregoing apparatuses/units and the execution processes thereof is based on a same concept as the method embodiments of this application. For specific functions and technical effects of the content, refer to the method embodiments. Details are not described herein again.

Figure 9:
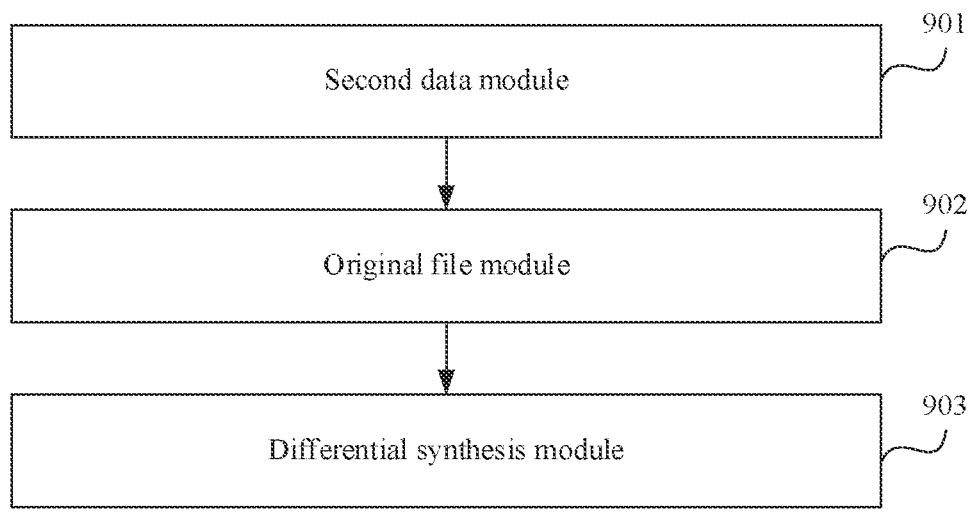
FIG. 9 is a schematic diagram of user equipment according to an embodiment of this application.

The following describes in detail user equipment provided in embodiments of this application. Refer to FIG. 9. The user equipment provided in this embodiment includes:
a second data module 901, configured to obtain patch data, where the patch data is data obtained by performing differential processing on device tree source data and device tree target data by a development device;
an original file module 902, configured to obtain an original device tree image file; and
a differential synthesis module 903, configured to perform differential synthesis on the patch data and the original device tree image file to obtain an updated device tree image file.

Optionally, the second data module 901 includes:

a patch file submodule, configured to obtain a patch file, where the patch file includes patch data corresponding to at least one mainboard identifier;

a target identifier submodule, configured to obtain a target mainboard identifier; and a patch searching submodule, configured to search the patch file for target patch data corresponding to the target mainboard identifier.

Correspondingly, the differential synthesis module 903 is specifically configured to: if the target patch data corresponding to the target mainboard identifier exists in the patch file, perform differential synthesis on the target patch data and the original device tree image file to obtain the updated device tree image file.

Optionally, the second data module 901 includes:

a patch signing submodule, configured to obtain a digital signature of a patch partition, and perform security check on the patch partition based on the digital signature of the patch partition; and a patch check submodule, configured to: if the security check on the patch partition succeeds, obtain the patch data from the patch partition.

Optionally, the second data module 901 further includes:

a data receiving submodule, configured to receive patch data sent by the development device, and store the patch data in the patch partition.

Optionally, the original file module 902 includes:

a device signing submodule, configured to obtain a digital signature of a device tree partition, and perform security check on the device tree partition based on the digital signature of the device tree partition; and a device check submodule, configured to: if the security check on the device tree partition succeeds, obtain the original device tree image file from the device tree partition.

It should be noted that content such as information exchange between the foregoing apparatuses/units and the execution processes thereof is based on a same concept as the method embodiments of this application. For specific functions and technical effects of the content, refer to the method embodiments. Details are not described herein again.

Figure 10:
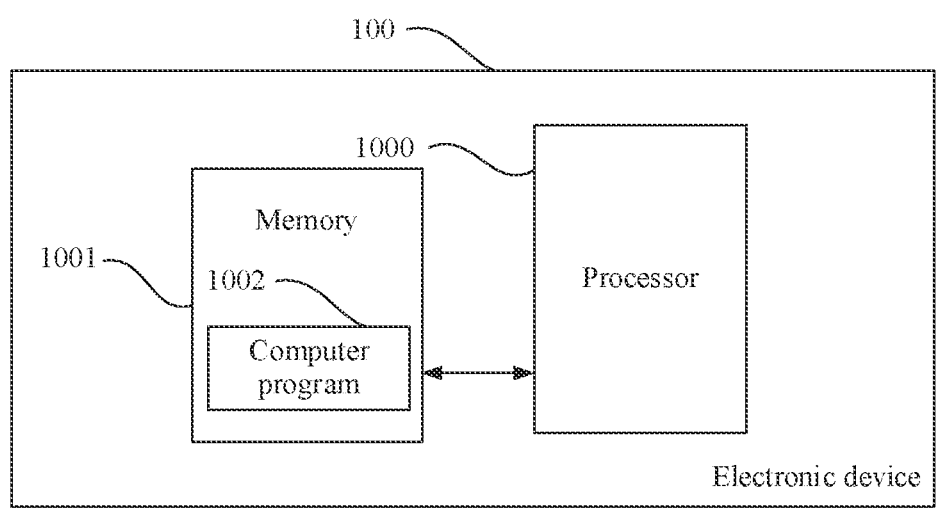
FIG. 10 is a schematic diagram of another electronic device according to an embodiment of this application.

Refer to FIG. 10. An embodiment of this application further provides an electronic device. As shown in FIG. 10, the electronic device 100 in this embodiment includes: a processor 1000, a memory 1001, and a computer program 1002 that is stored in the memory 1001 and that can run on the processor 1000. When executing the computer program 1002, the processor 1000 implements the steps in the foregoing screen extension method embodiment, for example, steps S601 to S603 shown in FIG. 6. Alternatively, when executing the computer program 1002, the processor 1000 implements functions of the modules/units in the foregoing apparatus embodiments, for example, functions of the modules 801 to 803 shown in FIG. 8.

For example, the computer program 1002 may be divided into one or more modules/units. The one or more modules/units are stored in the memory 1001, and are executed by the processor 1000, to complete this application. The one or more modules/units may be a series of computer program instruction segments that can implement a specific function, and the instruction segment is used to describe an execution process of the computer program 1002 in the electronic device 100. For example, the computer program 1002 may be divided into a first data module, a differential processing module, and a data sending module. Specific functions of the modules are as follows:

The first data module is configured to obtain device tree source data and device tree target data.

The differential processing module is configured to perform differential processing on the device tree source data and the device tree target data to obtain patch data.

The data sending module is configured to send the patch data to user equipment, to indicate the user equipment to perform differential synthesis on the patch data and an original device tree image file in the user equipment, to obtain an updated device tree image file.

The electronic device 100 may be a computing device such as a desktop computer, a notebook computer, a palmtop computer, or a cloud server. The electronic device may include, but is not limited to, a processor 1000 and a memory 1001. Persons skilled in the art may understand that FIG. 10 is merely an example of the electronic device 100, and does not constitute a limitation on the electronic device 100, which may include more or fewer components than those shown in the figure, or may combine some components, or may have different components. For example, the electronic device may further include an input/output device, a network access device, a bus, or the like.

The processor 1000 may be a central processing unit (Central Processing Unit, CPU), or may be another general-purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or a transistor logic device, a discrete hardware component, or the like. The general-purpose processor may be a microprocessor, or the processor may be any conventional processor or the like.

The memory 1001 may be an internal storage unit of the electronic device 100, for example, a hard disk or a memory of the electronic device 100. The memory 1001 may alternatively be an external storage device of the electronic device 100, for example, a plug-in hard disk, a smart media card (Smart Media Card, SMC), a secure digital (Secure Digital, SD) card, or a flash card (Flash Card) that is disposed on the electronic device 100. Further, the memory 1001 may further include both an internal storage unit and an external storage device of the electronic device 100. The memory 1001 is configured to store the computer program and other programs and data required by the electronic device. The memory 1001 may be further configured to temporarily store data that has been output or is to be output.

Persons skilled in the art may clearly understand that, for the purpose of convenient and brief description, division into the foregoing function units or modules is merely used as an example for description. In an actual application, the foregoing functions may be allocated to different function units or modules for implementation based on a requirement. That is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units or modules in the foregoing system, refer to a corresponding process in the foregoing method embodiments. Details are not described herein again.

In the foregoing embodiments, descriptions of embodiments have respective focuses. For a part that is not described in detail or recorded in an embodiment, refer to related descriptions in other embodiments.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

In embodiments provided in this application, it should be understood that the disclosed apparatus/electronic device and method may be implemented in other manners. For example, the described apparatus/electronic device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When the integrated module/unit is implemented in a form of a software functional unit and sold or used as an independent product, the integrated module/unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code. The computer program code may be in a source code form, an object code form, an executable file form, some intermediate forms, or the like. The computer-readable storage medium may include any entity or apparatus that can carry the computer program code, a recording medium, a USB flash drive, a removable hard disk, a magnetic disk, a compact disc, a computer memory, a read-only memory (ROM, Read-Only Memory), a random access memory (RAM, Random Access Memory), an electrical carrier signal, a telecommunication signal, a software distribution medium, and the like. It should be noted that content included in the computer-readable storage medium may be appropriately added or deleted based on requirements of legislation and patent practice in a jurisdiction. For example, in some jurisdictions, according to legislation and patent practice, the computer-readable storage medium does not include the electrical carrier signal or the telecommunication signal.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for repairing a device tree and implemented by user equipment, the method comprising:
    obtaining, from a development device, a patch file that comprises patch data, wherein the patch data is based on differential processing on device tree source data and device tree target data, and wherein the patch data corresponds to at least one mainboard identifier of a plurality of mainboard identifiers;
    obtaining a target mainboard identifier;
    searching the patch file for target patch data corresponding to the target mainboard identifier;
    obtaining an original device tree image file; and
    performing, when the patch file comprises the target patch data, differential synthesis on the target patch data and the original device tree image file to generate an updated device tree image file.

2. The method of claim 1, wherein obtaining the patch data comprises:
    obtaining a digital signature of a patch partition;
    performing a security check on the patch partition based on the digital signature; and
    obtaining, when the security check succeeds, the patch data from the patch partition.

3. The method of claim 2, wherein before obtaining the digital signature, the method further comprises:
    receiving the patch data from the development device; and
    storing the patch data in the patch partition.

4. The method of claim 1, wherein obtaining the original device tree image file comprises:
    obtaining a digital signature of a device tree partition;
    performing a security check on the device tree partition based on the digital signature; and
    obtaining, when the security check succeeds, the original device tree image file from the device tree partition.

5. The method of claim 1, wherein the patch file further comprises a first hash value of the device tree source data, a second hash value of the device tree target data, and a third hash value of the patch data.

6. The method of claim 5, further comprising checking the patch data using the first hash value, the second hash value, and the third hash value.

7. The method of claim 1, further comprising storing the patch file in a patch partition of a storage space of the user equipment.

8. User equipment, comprising:
    a memory configured to store instructions; and
    a processor coupled to the memory and configured to execute the instructions to cause the user equipment to:

obtain a patch file that comprises patch data, wherein the patch data originated from a development device and is based on differential processing on device tree source data and device tree target data, and wherein the patch data corresponds to at least one mainboard identifier of a plurality of mainboard identifiers;

obtain a target mainboard identifier;

search the patch file for target patch data corresponding to the target mainboard identifier;

obtain an original device tree image file; and perform, when the patch file comprises the target patch data, differential synthesis on the target patch data and the original device tree image file to generate an updated device tree image file.

9. The user equipment of claim 8, wherein when executed by the processor, the instructions further cause the user equipment to:

obtain a digital signature of a patch partition;

perform a security check on the patch partition based on the digital signature; and obtain, when the security check succeeds, the patch data from the patch partition.

10. The user equipment of claim 8, wherein when executed by the processor, the instructions further cause the user equipment to:

receive the patch data from the development device; and store the patch data in a patch partition.

11. The user equipment of claim 8, wherein when executed by the processor, the instructions further cause the user equipment to:

obtain a digital signature of a device tree partition;

perform a security check on the device tree partition based on the digital signature; and obtain, when the security check succeeds, the original device tree image file from the device tree partition.

12. The user equipment of claim 8, wherein the patch file further comprises a first hash value of the device tree source data, a second hash value of the device tree target data, and a third hash value of the patch data.

13. The user equipment of claim 12, wherein when executed by the processor, the instructions further cause the user equipment to check the patch data using the first hash value, the second hash value, and the third hash value.

14. The user equipment of claim 8, wherein when executed by the processor, the instructions further cause the user equipment to store the patch file in a patch partition of a storage space of the user equipment.

15. A method for repairing a device tree, the method comprising:

obtaining, by a development device comprising a first memory and a first processor, a basic device tree image file and a target device tree image file;

storing, by the development device, the basic device tree image file and the target device tree image file;

performing, by the development device, format parsing on the basic device tree image file to obtain device tree source data corresponding to each mainboard identifier of a plurality of mainboard identifiers;

performing, by the development device, format parsing on the target device tree image file to obtain device tree target data corresponding to each mainboard identifier of the plurality of mainboard identifiers;

separately performing, by the development device, differential processing on the device tree source data corresponding to each mainboard identifier of the plurality of mainboard identifiers and the device tree target data corresponding to each mainboard identifier of the plurality of mainboard identifiers to obtain respective patch data corresponding to each mainboard identifier of the plurality of mainboard identifiers;

generating, by the development device, patch data based on the respective patch data corresponding to each mainboard identifier;

sending, by the development device, the patch data to user equipment to indicate to the user equipment to perform differential synthesis on the patch data and an original device tree image file in the user equipment, wherein the user equipment comprises a second memory and a second processor;

searching, by the user equipment, a patch file for target patch data corresponding to a target mainboard identifier, wherein the patch file comprises the patch data, and wherein the target mainboard identifier is one of the plurality of mainboard identifiers; and performing, by the user equipment when the patch file comprises the target patch data, differential synthesis on the target patch data and the original device tree image file to generate an updated device tree image file.

16. The method of claim 15, wherein sending the patch data to the user equipment comprises:

encapsulating the patch data into a patch file based on a preset data format; and sending the patch file to the user equipment.

17. The method of claim 15, further comprising:

calculating, by the development device, a first hash value of the device tree source data, a second hash value of the device tree target data, and a third hash value of the patch data; and storing, by the development device, the first hash value, the second hash value, and the third hash value in a patch file, wherein the patch file comprises the patch data.

18. A system comprising:

a development device, comprising:

a first memory configured to store first instructions; and a first processor coupled to the first memory and configured to execute the first instructions to cause the development device to:

obtain a basic device tree image file and a target device tree image file;

store the basic device tree image file and the target device tree image file;

perform format parsing on the basic device tree image file to obtain device tree source data corresponding to each mainboard identifier of a plurality of mainboard identifiers;

perform format parsing on the target device tree image file to obtain device tree target data corresponding to each mainboard identifier of the plurality of mainboard identifiers;

separately perform differential processing on the device tree source data corresponding to each mainboard identifier of the plurality of mainboard identifiers and the device tree target data corresponding to each mainboard identifier of the plurality of mainboard identifiers to obtain respective patch data corresponding to each mainboard identifier of the plurality of mainboard identifiers;

generate patch data based on the respective patch data corresponding to each mainboard identifier; and send the patch data to indicate to perform differential synthesis on the patch data and an original device tree image file; and user equipment, comprising:
  a second memory configured to store second instructions; and
  a second processor coupled to the second memory and configured to execute the second instructions to cause the user equipment to:
    receive, from the development device, the patch data;
    search, by the user equipment, a patch file for target patch data corresponding to a target mainboard identifier, wherein the patch file comprises the patch data, and wherein the target mainboard identifier is one of the plurality of mainboard identifiers; and
    perform, by the user equipment when the patch file comprises the target patch data, differential synthesis on the target patch data and the original device tree image file to generate an updated device tree image file.

19. The system of claim 18, wherein when executed by the first processor, the first instructions further cause the development device to:
  encapsulate the patch data into a patch file based on a preset data format; and
  send the patch file to the user equipment.

20. The system of claim 18, wherein when executed by the first processor, the first instructions further cause the development device to:
  calculate a first hash value of the device tree source data, a second hash value of the device tree target data, and a third hash value of the patch data; and
  store the first hash value, the second hash value, and the third hash value in a patch file, wherein the patch file comprises the patch data.

* * * * *